United States Patent

Saito et al.

[11] Patent Number: 5,916,519
[45] Date of Patent: Jun. 29, 1999

[54] HYDROGEN STORAGE ALLOY CONTAINING IRON

[75] Inventors: Nobuyuki Saito; Masashi Takahashi; Takashi Sasai, all of Tsukuba, Japan

[73] Assignee: Japan Metals & Chemicals Co., Ltd., Tokyo, Japan

[21] Appl. No.: 08/682,014

[22] Filed: Jul. 16, 1996

[30] Foreign Application Priority Data

May 1, 1996 [JP] Japan .................................. 8-110861

[51] Int. Cl.$^6$ .................................................. H01M 4/38
[52] U.S. Cl. ........................... 420/455; 420/900; 420/428; 420/581; 429/59; 429/101; 204/293
[58] Field of Search ........................... 420/900, 455, 420/428, 581; 429/223, 59, 101; 423/644; 204/293

[56] References Cited

U.S. PATENT DOCUMENTS 5,512,385  4/1996  Komori et al. .......................... 420/455

FOREIGN PATENT DOCUMENTS

| 60-250557 | 12/1985 | Japan . |
| 60-250558 | 12/1985 | Japan . |
| 63-164161 | 7/1988 | Japan . |
| 01054669 | 3/1989 | Japan . |
| 1-162741 | 6/1989 | Japan . |
| 04036431 | 2/1992 | Japan . |
| 04210440 | 7/1992 | Japan . |
| 5-70693 | 3/1993 | Japan . |
| 06172885 | 6/1994 | Japan . |
| 06176756 | 6/1994 | Japan . |
| 06306517 | 11/1994 | Japan . |

*Primary Examiner*—Margery Phipps
*Attorney, Agent, or Firm*—Oliff & Berridge, PLC

[57] ABSTRACT

To provide a hydrogen storage alloy usable as a negative electrode having a long life and good high-discharge characteristics. Hydrogen storage alloy for cell wherein its general expression is as follows:

$RNi_a Co_b Al_c Mn_d Fe_e$ (where R is a mixture of rare earth elements and contains 25~75 wt. % La; $3.7 \leq a \leq 4.0$, $0.1 \leq b \leq 0.4$, $0.20 \leq c \leq 0.4$, $0.30 \leq d \leq 0.45$, $0.2 \leq e \leq 0.4$, $0.5 \leq b+c \leq 0.7$, and $5.0 \leq a+b+c+d+e \leq 5.0$).

2 Claims, No Drawings

HYDROGEN STORAGE ALLOY CONTAINING IRON

BACKGROUND OF THE INVENTION

The present invention relates to a hydrogen storage alloy used as a negative electrode of a nickel-hydrogen cell, and particularly to a hydrogen storage alloy which has attained a low cost by suppressing the Co-content as well as providing a long life.

The hydrogen storage alloy fall into type AB, comprising rare earth elements and nickel (Ni), type $AB_2$ comprising zirconium (Zr) and manganese (Mg), and the like. Among these, type $AB_5$ is mainly used as a negative electrode material for nickel-hydrogen cells mounted in portable equipment and the like.

In nickel-hydrogen cells, it is known to use alloys consisting of rare earth elements and nickel containing ternary or quaternary compositions such as RNiAlCo, RNiMnAlco and LaNiMnAlCo. In practice, in nickel-hydrogen cells, the hydrogen stored alloys usually contain about 6~10 wt. % Co.

The reason for adding Co element to the above-mentioned alloys is to improve the cycle life of charge and discharge.

SUMMARY OF THE INVENTION

There have been proposed many hydrogen storage alloys containing Co or electrodes into which a hydrogen storage alloy is incorporated such as $RNi(a+b+c)A_{a-}Al_{,b}Co_c$ alloys (where A comprises at least one of Mn, Fe or Cr.). For example, Japanese Patent Laid Open Publication No. 5-70693 describes alloys containing Co in an atomic ratio of 0.01~1. Japanese Patent Laid Open Publication No. 1-162741 describes hydrogen storage alloy electrodes having a high Co content in an atomic ratio of 0.8~1.2, and comprising RNiAlCoMn, and the like.

Co contained in the hydrogen storage alloy has standard electrode potential which is lower than that of Ni only by 0.01 V, it also has the effect of suppressing oxidation of Ni by charge-discharge and over discharge, at high temperature. For this reason, cobalt is one of the fundamental elements in this kind of alloy system. However, since Co is an expensive component used also as an essential element in lithium ion cells and the like, and the amount of its production is also limited, it is preferably used as little as possible.

Furthermore, although the hydrogen storage alloy containing a large quantity of Co shows a superiority in cycle life characteristics, it has the problem of having inferiority in high-rate discharge characteristics compared with alloys containing no Co. Under these circumstances it has been desirable to attain a longer life hydrogen storage alloy by other means than adding Co.

In consideration of said problems of the prior art, it is an object of the present invention to provide a hydrogen storage alloy having a long life and superior discharge characteristics and being usable for negative electrodes for hydrogen cells.

It is another object of the present invention to provide a hydrogen storage alloy with a long life and superior discharge characteristics cheaply without containing much Co.

As a result of eager research for realizing said objects, the inventors came to the conclusion that is was necessary to investigate substitutable elements of Co among the components of hydrogen storage alloys of RNiCoAlMn system.

Several perspective elements are described in said Japanese Patent Laid Open Publication No. 5-70693 and Japanese Patent Laid Open Publication No. 1-162741. The elements include Cr, FE, Cu, Sn, V, Si, Mo, Nb and Mg and the like. The present applicant focused on Fe, Sn, V, Cr, Si, Mo, Nb and Cu as substitute elements of Co and examined the characteristics thereof.

As a result, it has been found that Fe is the most effective as a substitute element having equal discharge capacity and cycle characteristics of electrochemical reactions of Co element. Moreover, it does not significantly change the hydrogen balancing pressure, and causes only a small hysteresis (difference between occlusion and discharge pressure).

Furthermore, in the alloy system of type $AB_5$ to which Fe was added as a Co-substituting element, as a result of designing the amount of added Ni, Al and Mn respectively so that the hydrogen equilibrium pressure may fall within the desired pressure range, the solid phase reaction has a non-stoichiometric ratio in which the segregation phase of La content or substituted Fe content in the rare earth element mixture R is not observed by means of structure observation, a hydrogen storage alloy with the following general expression is obtained:

$$RNi_aCo_bAl_cMn_dFe_e$$

(where R is a mixture of rare earth elements and contains 25~70 wt % La; $3.7 \leq a \leq 4.0$, $0.1 \leq b \leq 0.4$, $0.20 \leq c \leq 0.4$, $0.30 \leq d \leq 0.45$, $0.2 \leq e \leq 0.4$, $0.5 \leq b+c \leq 0.7$, and $5.0 \leq a+b+c+d+e \leq 5.1$)

In the following, a fundamental designing concept of the hydrogen storage alloy according to the present invention is described.

The hydrogen storage alloy according to the present invention is a sexternary alloy of R of A site as well as a Ni, Co, Al, Mn and Fe of B site. It is a fundamental designing concept of the present invention to find out a combination of the elements and a composition ratio thereof having a good cycle characteristics and large discharge capacity among the combination of these elements.

The reason for limiting the composition which satisfies such conditions to the above-mentioned (general expression) is as follows:

In the present invention, the quantitative relations between La- and Co-content in R and Fe are the most important factors influencing said cell characteristics. That is, when Fe is over 0.4 even if the La-content falls within the range of 25~70 wt. %, the added Fe-element forms a dense oxide film on the alloy surface, thereby checking a discharge reaction. And, if Fe is lower than 0.2, such disadvantage is eliminated, however, since the oxidation of La on the high La-side (50~70 wt. %) and the oxidation of Mn can not be suppressed, the amount of Fe shall be in the range of 0.2~0.4 in the atomic ratio.

Furthermore, the solid solution limit of Fe is considered to be influenced by the amount of added La, and when the amount of added La exceeds 70 wt. %, a segregation phase of Fe is precipitated. On the other hand, when the amount of added La is lower than 25 wt. %, a large amount of Mn is added for regulating the hydrogen equilibrium pressure, which makes it difficult to suppress the formation of Mn oxide. Therefore, the amount of La shall be in the range of 25~70 wt. %.

In the present invention, as for the ratio of A site and B site, when $x$ of $AB_x$, that is, (a+b+c+d+e) of the general expression exceeds 5.1, the elements constituting B site form segregation phase together with Fe, the mother phase becomes a R-enriched phase, and the cycle characteristics are deteriorated. On the other hand, when $x$ of $AB_x$ is lower than 5.0, the capacity becomes large and the cycle characteristics are extremely deteriorated.

Therefore, the AB ratio of the alloy containing Fe according to the present invention shall be in the range of $5.0 \leq (a+b+c+d+e) \leq 5.1$.

And then, the amount of Fe and Co shall be 0.5~0.7 in total. The reason therefor is that Fe is passivated and the discharge capacity is decreased when the total amount exceeds 0.7, and that the cycle characteristics are deteriorated when it is less than 0.5.

Furthermore, Co shall be 0.1~0.4. The reason therefor is that 0.4 is set to the upper limit with due regard to suppressing the amount of added Co although the discharge capacity and the cycle life are satisfactory when the amount of added Co falls within the range of 0.5~1.0, and that on discharge capacity and the cycle characteristics are deteriorated when Co is less than 0.1.

The reason why Al shall be 0.2~0.4 is that the pressure regulation in the –phase region is difficult when Al is less than 0.2, and that the pressure in the α-phase region is too low and the amount of the store hydrogen is decreased when Al is over 0.4.

The reason why Mn shall be 0.3~0.45 is that the hydrogen equilibrium pressure is raised when Mn is less than 0.3, and that the hydrogen equilibrium pressure is reduced when Mn exceeds 0.45. In the latter case, more Mn oxide is produced in an alkali aqueous solution, which cannot be controlled by means of said amount of Co and Fe.

Further, as for Ni, the value is inevitably determined from the preferable combination of other B site raw materials, that is, from the total amount of Co, Mn, Al and Fe.

EXAMPLES

In the following, the present invention is described concretely based on the example.

First, in order to prepare alloys as specimen, a predetermined amount of R, Ni, Co, Al, Mn and Fe was weighed, and the alloys were obtained by means of an arc melting method. And by these alloys were subjected to homogenizing treatment means of heat treatment of 1000° C. and 10 hours in an Ar atmosphere. The thus obtained alloys were ground to less than and equal to 75 μm by means of mechanical grinding, and MH electrodes were manufactured from these alloy powders.

In manufacturing these MH electrodes, after 0.25 parts of weight of Ni powder as conductor and 0.03 parts by weight of polytetrafluoroethylene as binder were mixed with 1 part by weight of hydrogen-occlusive alloy respectively, alloy sheet was rolled therefrom, and this alloy sheet was held between Ni mesh and subjected obtaining to pressurized shaping, thereby an electrode sheet of 1.5×1.5 mm.

The thus obtained said MH electrode was tested on the discharge capacity and the cycle life thereof. In this test, after said MH electrode was clamped between sintered Ni hydroxide electrodes having sufficient capacity via a separator, and was inserted into the predetermined cell, electrolyte of 6 normal KOll aqueous solution was poured and an open-type half cell was obtained.

Further, as for said discharge capacity in this test, a value was used at which the discharge capacity is saturated by repeating cycles of discharging till –0.65V to a reference electrode of mercury oxide at a current density of 60 mA/g after charging till 360 mAh/g at a temperature of 25° C. and a current density of 60 mA/g.

In said cycle test, cycle characteristics were obtained from the capacity maintaining rate when charging till 360 mAh/g in a highly corrosive temperature range of 45° C. and at a current density of 150 mA/g, and repeating discharges at a current density of 300 mA/g (discharge terminating voltage to the reference electrode of mercury oxide is –0.65V) as acceleration test conditions.

As described above, according to the present invention, a hydrogen storage alloy for cell is obtained which can maintain good cycle characteristics by reducing Co by means of the substitution of Fe without detracting the discharge capacity much.

What is claimed is:

1. Hydrogen storage alloy for a negative electrode of a nickel-hydrogen cell, the hydrogen storage alloy consisting of:

$RNi_aCo_bAl_cMn_dFe_e$ where R consists of a mixture of lanthanum and at least one additional rare earth element, wherein lanthanum comprises 25–70 percent by weight of the total weight of the mixture, and a, b, c, d and e represent atomic ratios of corresponding elements wherein:

$3.7 \leq a \leq 4.0$, $0.1 \leq b \leq 0.4$, $0.20 \leq c \leq 0.4$, $0.30 \leq d \leq 0.45$, $0.2 \leq e \leq 0.4$, $0.5 \leq b+e \leq 0.7$, and $5.0 \leq a+b+c+d+e \leq 5.1$.

2. An electrode comprising the hydrogen storage alloy according to claim 1.

* * * * *